F. M. FURBER.
METHOD OF CUTTING BLANKS FROM SHEET MATERIAL.
APPLICATION FILED AUG. 19, 1918.
1,396,185.
Patented Nov. 8, 1921.
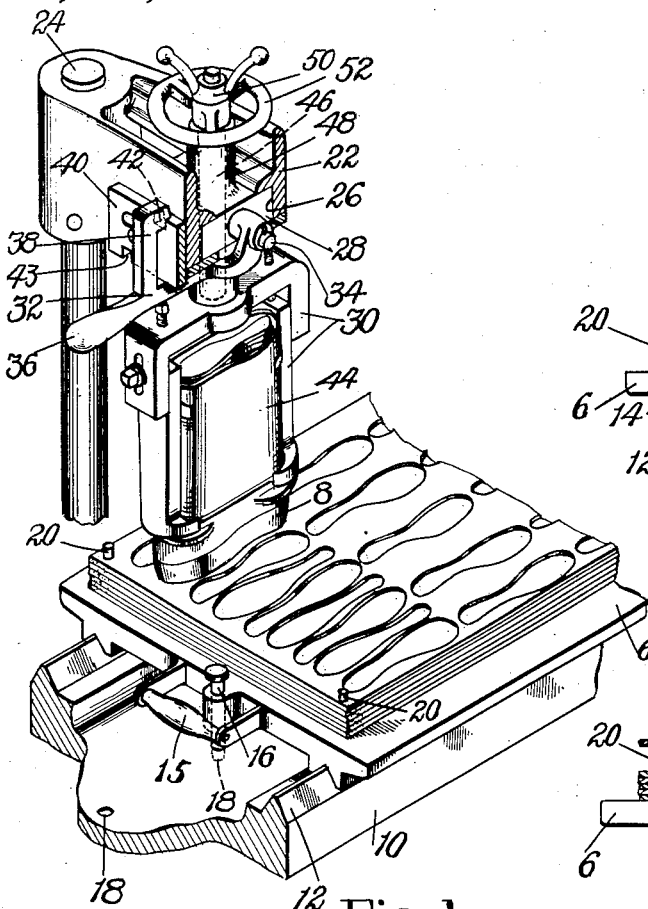
Fig. 1.
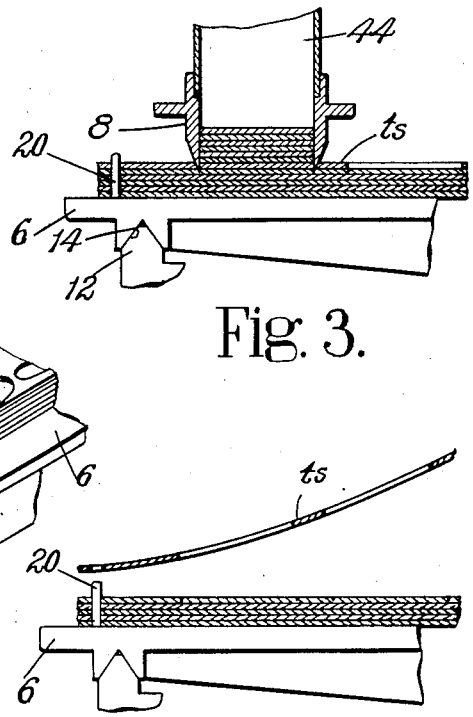
Fig. 3.
Fig. 4.
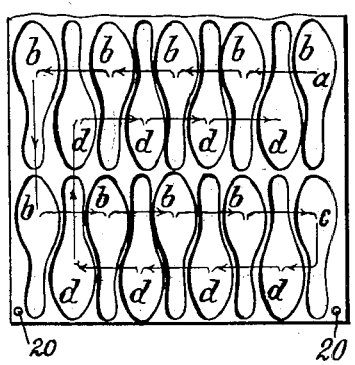
Fig. 2.
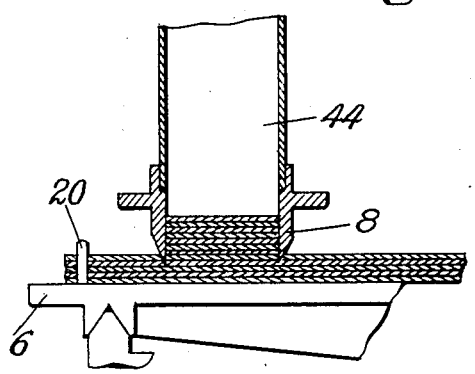
Fig. 5.
INVENTOR.
Frederick M Furber

UNITED STATES PATENT OFFICE.

FREDERICK M. FURBER, OF REVERE, MASSACHUSETTS, ASSIGNOR TO UNITED SHOE MACHINERY CORPORATION, OF PATERSON, NEW JERSEY, A CORPORATION OF NEW JERSEY.

METHOD OF CUTTING BLANKS FROM SHEET MATERIAL.

1,396,185. Specification of Letters Patent. Patented Nov. 8, 1921.

Application filed August 19, 1918. Serial No. 250,496.

*To all whom it may concern:*

Be it known that I, FREDERICK M. FURBER, a citizen of the United States, residing at Revere, in the county of Suffolk and State of Massachusetts, have invented certain Improvements in Methods of Cutting Blanks from Sheet Material, of which the following description, in connection with the accompanying drawings, is a specification, like reference characters on the drawings indicating like parts in the several figures.

This invention relates to improvements in methods of cutting stock. The invention is herein set forth by way of illustration with particular reference to its use in the cutting of blanks from sheet material by cutting tools, such as dies, although the invention is not restricted to such use.

An object of the present invention is to devise a method of cutting stock, such as sheet material, the practice of which will insure clean cutting of the stock without frayed or ragged edges, objectionable compression or mutilation of the stock, or any of the other disadvantageous results frequently experienced heretofore in the use of known methods of cutting sheet material.

Another object of the invention is to produce a method of cutting stock which, while insuring accurate and clean cutting, will eliminate various disadvantages attendant upon the use of cutting beds or blocks, such for example as wooden or metal beds, and the practice of which will generally be more satisfactory and economical than methods heretofore practised.

In one aspect the present invention contemplates positioning sheet material subsequently to be cut in such manner that it will itself serve as a cutting bed for a cutting operation performed upon other sheet material superimposed on this cutting bed, performing a cutting operation on the superimposed sheet material, and subsequently utilizing other sheet material as a cutting bed while performing a cutting operation on the first-named sheet. In practice a number of sheets of material may be successively positioned to act as cutting beds and the cutting operations will be performed upon successive sheets of material while each in turn lies superimposed upon one of said cutting beds.

A conspicuous advantage of this invention is that it entirely eliminates the delay and expense incident to resurfacing cutting beds as has been necessary heretofore, especially in the use of wooden cutting beds. Another advantage consists in the economy permitted from the fact that the material serving as a cutting bed is itself in turn cut, thereby eliminating waste of material.

To facilitate subsequent utilization of material which has served as a cutting bed the present invention provides for positioning that material for a cutting operation thereon in the same relation to the cutting instrumentality in which the previously cut material was positioned. This is of particular advantage in that it permits the cutting tool to cut part way into the sheet material which is being used as a cutting bed, as it is desirable or necessary in many instances for clean cutting without, however, impairing the availability of the cutting bed to be in turn utilized. One way of obtaining this advantage is to position two or more sheets of material with the top sheet and the lower sheet in locations determined relatively to the path of a cutting tool by positioning surfaces associated with the sheets and the work support, the top sheet being removed after it has been cut and being replaced with a sheet which has served as a lower sheet and which is located in the same relation to the path of the cutting tool as that which it occupied while it served as a cutting bed, and then to cut through the replaced sheet in the incision previously made by cutting into it.

Another object of the invention is to provide an improved method of cutting and magazining stock. In this aspect the invention provides a novel and improved method of obtaining a unit magazine content. The invention also provides an improved method of cutting right and left blanks.

While the invention in its broader aspect relates to the cutting of all kinds of stock, for the purposes of illustration it is herein considered in connection with its application in the cutting of fillers and heel lifts and other shoe parts from relatively large sheets of material usually of predetermined dimensions so related to the size of the particular blanks to be cut therefrom as to yield a known number of blanks with a minimum of waste.

Other objects and features of the invention will be apparent from the following detailed description.

In the drawings,

Figure 1 is a perspective view, partly in section, of a cutting machine which may be used in the practice of the method herein described;

Fig. 2 is a plan view of a sheet of material illustrating one method of cutting blanks therefrom; and Figs. 3, 4 and 5 are detail sectional views illustrating a method of cutting blanks from each sheet in succession from top to bottom of the pile of sheets.

The mechanism shown is illustrative merely of one type of mechanism which may be utilized in practising the herein-disclosed method of cutting blanks from sheet material. While this improved method of cutting blanks has wide application in various arts, it is here related more particularly to processes involved in the manufacture of fillers for shoe soles. As illustrated, the machine comprises a work support 6 designed to support the stacks or piles of sheet material for the operation of the die 8. The movable table or work support is conveniently mounted for sliding movement on a frame 10 by means of tracks or guides 12 which coöperate with correspondingly shaped guideways or grooves 14 on the under side of the support 6. For easy adjustment of the work table there is provided at one end of the same a handle 15 and adjacent thereto a latch 16 spring-pressed downwardly so that the said latch may be caused to engage selectively any one of a plurality of openings 18 in the frame 10. Obviously, the spacing between the openings 18 will correspond with the dimension of the blank in the direction of the length of the table or work support since the purpose of the adjustment is to provide for the cutting of successive rows of blanks from each sheet on the table. Mounted upon the table are pegs or studs 20 which serve the purpose of holding the superimposed sheets of material in predetermined relation so that the sheets may not be displaced during the operation of the die thereon and in order that the lowermost sheet may be removed from the table or support and placed upon a stack of sheets newly introduced into the machine and then occupy the same position relative to the die that it had while resting directly on the work support. The number of studs may vary as the conditions may determine and they may, moreover, be replaced by any equivalent structure designed to hold the sheets in the desired position relative to the die. Moreover, they may be dispensed with entirely under certain circumstances hereinafter discussed.

The mechanism for operating the die in the illustrative machine comprises a cross-head 22 arranged to be reciprocated vertically by pitmen, one at each end of the cross-head as indicated at 24. Extending longitudinally of the cross-head is a guideway 26 which slidably receives a block 28 designed to support the die carrier 30. In order that the carrier may be moved along the cross-head and temporarily secured in adjusted position, there is provided a member 32 pivoted at 34 to the block 28 and provided with a handle 36 for manipulation of said member. Extending upwardly from the member 32 at one side of the cross-head is a locking member 38 having an end portion designed to engage selectively in any one of a plurality of notches in a bar 40 detachably secured to the side of the cross-head. Obviously, these notches, one of which is shown at 42 on the upper edge of the bar 40 and another at 43 on the lower edge thereof, are spaced in accordance with the dimension of the blank crosswise of the table and in accordance also with the plan adopted in cutting blanks from the sheet material. When it is desired to cut blanks of a different shape or of a different size than that shown, or when cutting blanks in a different order from that disclosed in Fig. 1, the bar 40 may be removed and replaced by another bar having the notches placed to correspond with the new work or the new mode of procedure. As each blank is cut from the sheet material it is forced upwardly in the die by each succeeding blank until the blanks enter and completely fill a magazine 44 which is secured to the hollow die 8 in such a way as to form an upward extension thereof. When the magazine becomes filled the machine will be allowed to rest until the magazine can be emptied, the arrangement being such that normally a predetermined number of sheets will be cut into blanks in completely filling the magazine. In selecting the stock or sheets of material to be operated upon, it is desirable that the sheet be of such dimensions that when cut into blanks, the said blanks will just fill the magazine, thus conveniently determining the duration of one set of operations of the mechanism used in carrying out the method herein disclosed. Thus at the end of the operation of cutting a sheet into blanks, another sheet is positioned, or is discovered in position, for cutting, and an empty magazine substituted for the filled one.

In cutting blanks of the shape illustrated in the drawings, wherein each blank is shown to be wider at one end than at the other, and so shaped as to provide what may be denominated "rights" and "lefts," the method followed is illustrated in Figs. 1 and 2 and is seen to comprise the steps of cutting two rows of blanks with the wide end of the die facing in one direction and then revers- ing the die end for end to cut blanks from the material between the cut-out portions resulting from the prior operations. Referring to Fig. 2 of the drawings, the reference character *a* denotes the starting point in cutting blanks from this sheet. The blanks *b* are cut in succession with the large end of the die facing in one direction until the point *c* is reached and the blank at that point cut from the sheet. During the movements of the die just described the member 32 engages the lower row of notches 43. Thereafter the die is adjusted in reverse position, that is, with the large end pointing in the opposite direction. The die is so mounted that in the reversing operation it is moved laterally half the normal spacing and then operated to cut the first blank *d*. Thereafter the adjustments of the die laterally follow the normal spacings of the notches 42 on the upper edge of the bar 40 and the succeeding blanks *d* are cut from the sheet material. Provision for adjusting the die alternately in reverse positions is made by a connection between the die carrier 30 and the block 28 which comprises a shaft 46 extending through a sleeve 48 integral with the said block 28. In order to secure the carriage 30 in the desired relation to the block 28 it is necessary only to tighten the winged nut 50 after manipulation of the hand wheel 52 to effect the rotation of the shaft 46 in the desired direction. It will be understood that the mechanism herein described illustrates but one form of mechanism that may be used in the practice of my invention and that the essential features of said mechanism are the work support, the die and the means for forcing the die through the sheet material carried by the work support. Clearly, the die may be entirely free of any operating mechanism so that it may be positioned manually in the restricted sense of the term. It will be understood also that the term die is used because of its convenience and is intended to cover punches and other cutters used in cutting blanks from sheets.

In practising the method illustrated in Figs. 3, 4 and 5 of the drawings, a stack of sheets is placed upon the table with the pins 20 engaging in perforations in the said sheets to hold them in predetermined superimposed relation and the die is then operated to cut through the top sheet of the stack of sheets and to enter and cut part way only through the second sheet, thus utilizing said second sheet as a cutting bed for the first sheet. When the top sheet has been cut into blanks it is removed, as indicated in Fig. 4, and the operator then proceeds to cut the new top sheet, using the sheet next subjacent thereto as a cutting-bed sheet as in the preceding operation. This series of operations is repeated until the lowermost sheet is reached, which sheet has served as a cutting-bed sheet for the sheet next superjacent thereto. When this lowermost sheet is reached in the operation last described it is removed and placed upon the top of another stack of sheets newly introduced into the machine. Since the pins on the work support hold the sheets in predetermined relation relative to the die, the top sheet, which in the preceding operation served as a cutting-bed sheet, will have the incisions made therein by the die located in proper alinement with the die so that in the operation of cutting blanks from said sheet the die will enter the sheet through said incisions and cut blanks therefrom free from any cuts or incisions. In some classes of work the blanks will be put to such use that it is a matter of indifference whether or not the slight incisions made by the die when the sheet served as a cutting-bed sheet appear in the blanks. In such cases the pins 20 may be dispensed with, thus omitting the step of perforating or recessing in the process just described. It is pointed out that it is clearly within applicant's invention to modify the method above described to the extent of cutting through a plurality of sheets of material at one time instead of cutting each sheet in succession. Thus the die may be caused to cut blanks simultaneously from the first five sheets, for instance in Fig. 3, utilizing the lowermost sheet as the cutting-bed sheet, the procedure then being to remove the sheets from which the blanks have been cut and also said lowermost or cutting-bed sheet and place the latter upon a new stack of sheets positioned for cutting on the work support. Furthermore, under certain circumstances, it is contemplated to cut through a plurality of sheets at one operation to a sheet intermediate in the stack of sheets, the latter sheet serving as a cutting bed and then to repeat this operation, cutting a plurality of sheets in sets successively until the lowermost sheet of the stack is reached, removing the sheets which have been cut into blanks, and placing said lowermost sheet on a new stack of sheets as before described. Obviously, in cutting through a plurality of sheets individually and in succession as above described and in cutting through pluralities of sheets in sets and in succession, adjustment must be made either of the die or of the work support between the operations of cutting each sheet or each set of sheets into blanks. Such adjustment, especially of the work support, is broadly old and well known in a number of arts and accordingly no specific disclosure of such a mechanism is deemed necessary.

Applicant is aware of the fact that a strip of paper has been used in a perforating machine as a backing for the work during the operation of the punches. In such a machine it is necessary to provide means for feeding the strip of paper backing over the work support and to rewind it for further use. This strip, moreover, can be used only a few times when it must be discarded and a new supply introduced into the machine. In the said machine, furthermore, the strip of paper used is relatively narrow and, because of this and its light weight, can be readily handled by the machine and is not prohibitively expensive. The difficulties in the way of a successful adaptation of such a backing strip to the dieing-out and clicking machines, which are used in cutting relatively large blanks from sheet material such as leatherboard and felt, were unsurmountable from the practical standpoint and hence the use of such a backing strip with the machines mentioned was never seriously considered by those skilled in this art. Moreover, the expense of using a paper backing strip with machines of the type described would be prohibitive. By applicant's invention the backing strip is found in the sheet material being cut into blanks, thus eliminating entirely the element of expense. Furthermore, unlike the method involved in the use of the strip refered to, the improvement proposed by applicant presents as a feature of the greatest importance the provision of a fresh cutting bed for each sheet or set of sheets operated upon by the cutting means, thus invariably securing blanks having clean cut edges.

Having described my invention, what I claim as new and desire to secure by Letters Patent of the United States is:—

1. That improvement in methods of cutting blanks from sheet material for shoe bottom parts which comprises positioning sheet material to serve as a cutting bed in taking the thrust of the cutter, superimposing upon said cutting bed sheet material for a plurality of blanks performing cutting operations upon said superimposed sheet material, and subsequently utilizing other sheet material as a cutting bed and performing cutting operations upon said first-named sheet material.

2. That improvement in methods of cutting sheet material for shoe bottom parts which comprises successively positioning sheets of material each to serve during a plurality of cutting operations as a cutting bed in receiving the cutting edge of the cutter, and performing cutting operations upon successive sheets of material while each in turn lies in cutting position with relation to one of said cutting beds.

3. That improvement in methods of cutting sheet material for shoe bottom parts which comprises positioning sheet material in predetermined relation to a cutting instrumentality, superimposing sheet material to be cut upon said first-named sheet material, performing a cutting operation upon the superimposed sheet material while said first-named sheet acts as a cutting bed, and subsequently positioning said first-named sheet material in said predetermined relation to the cutting instrumentality and performing a cutting operation thereupon.

4. That improvement in methods of cutting sheet material for shoe bottom parts which comprises positioning two or more sheets upon a work support with the top sheet and a lower sheet in locations determined relatively to the path of a cutting tool by positioning surfaces associated with the sheets and the work support, cutting through the top sheet and into said lower sheet, removing the top sheet and replacing it with a fresh sheet, which has served as a lower sheet and which is located in the same relation to the path of the cutting tool, and cutting through said replaced sheet in the incision previously made by cutting into it.

5. That improvement in methods of cutting and magazining stock which consists in selecting a sheet of predetermined dimensions relative to the size of blanks to be produced in such manner that the magazine will be completely filled when the maximum number of blanks have been cut from the selected sheet and introduced into the magazine, cutting up the sheet and filling the magazine with the blanks whereby a unit magazine content is obtained, and replacing the scrap with a fresh sheet and the filled magazine with an empty magazine.

6. That improvement in methods of cutting right and left blanks from a sheet which consists in cutting over the sheet at regularly spaced intervals with a die positioned to cut one kind of blanks, repositioning or replacing the die to cut the other kind of blanks and cutting over the sheet in said intervals.

7. That improvement in methods of cutting right and left blanks from a sheet which consists in positioning a die to cut one kind of blanks, relatively moving the die and sheet to cut out successive rows of blanks separated by regularly spaced intervals in the rows, then repositioning or exchanging the die to cut the other kind of blanks and relatively moving the die and sheet reversely to cut over the sheet again in the said intervals.

8. That improvement in methods of cutting sheet material for shoe bottom parts which comprises the steps of placing a plurality of sheets in superimposed relation on a support, cutting through one sheet and simultaneously therewith utilizing the sheet next subjacent thereto as a cutting bed in receiving the thrust of the cutter, removing the scrap, and subsequently cutting the said sheet which served as a cutting bed while making use of another subjacent sheet as a cutting bed as in the previous operation.

9. That improvement in methods of cutting sheet material for shoe bottom parts which comprises the steps of placing a plurality of sheets in superimposed relation on a support, forcing a die through a plurality of the sheets and simultaneously therewith utilizing the lowermost sheet as a cutting bed for the sheets being operated on, removing the said lowermost sheet which has served as a cutting bed and placing it on top of a fresh stack of sheets placed on the work support, and proceeding to repeat the operations herein recited.

10. That improvement in methods of cutting sheet material for shoe bottom parts which comprises the steps of placing a plurality of sheets upon a work support, maintaining the sheets in predetermined relation to a cutting tool throughout a series of operations resulting in cutting through all of the sheets except the lowermost, the cutter being operated to penetrate only part way into said lowermost sheet, removing the scrap and also said lowermost sheet from the work support, and placing said lowermost sheet on top of a fresh pile of sheets placed upon the work support in said relation to the cutting tool.

11. That improvement in methods of cutting sheet material for shoe bottom parts which comprises the steps of placing two sheets in superposed contacting relation upon a work-support, cutting through the top sheet and part way only into the bottom sheet so that the said bottom sheet serves as a cutting bed, lifting the cutting-bed sheet after it has served a plurality of times as a cutting bed, and inserting thereunder a fresh sheet, cutting the sheet which served as a cutting-bed sheet, and proceeding to repeat the steps herein recited.

12. That improvement in methods of cutting sheet material which comprises the steps of perforating or recessing a plurality of sheets of material so that they may be readily stacked in predetermined superimposed relation, placing the said sheets on a work support with pins or pegs fixed to said work support extending through said perforations in the sheets, thus holding the sheets in said predetermined relation, forcing a die through one or more sheets, utilizing as a cutting bed a sheet subjacent to the sheet or sheets being operated upon, and when the lowermost sheet has served as a cutting bed, removing said lowermost sheet and positioning it in register with said pins or pegs upon a fresh stack or pile of sheets placed on the work support.

13. That improvement in methods of cutting blanks from sheet material for shoe bottom parts which comprises the steps of placing a plurality of sheets in superimposed relation on a support, cutting through one or more of the sheets with a die and simultaneously therewith utilizing one of the sheets in the pile as a cutting bed to support the sheet or sheets being operated on and to receive the cutting edge of the die, removing the scrap material, repeating the steps above recited until all of the sheets except the lowermost sheet are cut into blanks, and removing the said lowermost sheet and placing it on top of a new pile of sheets.

14. That improvement in methods of cutting blanks from sheet material which comprises the steps of perforating or recessing a plurality of sheets of material so that they may be readily stacked in superimposed predetermined relation, placing the said sheets on a work support with the aid of sheet locating means, engaging said perforations or recesses in the sheets, thus holding the sheets in said predetermined relation, forcing a die through one or more sheets, utilizing as a cutting bed a sheet subjacent to the sheet or sheets being operated upon, removing the blanks and scrap resulting from each dieing-out operation, and when the lowermost sheet of the pile has served as a cutting bed, removing said lowermost sheet and placing it upon a fresh stack or pile of sheets placed on the work support.

15. That improvement in methods of cutting sheet material to obtain from each sheet a plurality of blanks for shoe parts which comprises placing two sheets in superposed relation, cutting through one sheet and part way only into the other and repeating the operation to secure a plurality of blanks while the said other serves as a cutting bed in taking the thrust of the cutter, placing a fresh sheet in contacting relation with the cutting-bed sheet, cutting the sheet which previously served as a cutting-bed sheet while using said fresh sheet as a cutting bed, and repeating the steps herein recited.

In testimony whereof I have signed my name to this specification.

FREDERICK M. FURBER.